US006460802B1

(12) United States Patent
Norris

(10) Patent No.: US 6,460,802 B1
(45) Date of Patent: Oct. 8, 2002

(54) HELICOPTER PROPULSION AND CONTROL SYSTEM

(75) Inventor: Elwood G. Norris, Poway, CA (US)

(73) Assignee: Airscooter Corporation, Henderson, NV (US)

( * ) Notice: Subject to any disclaimer, the term of this patent is extended or adjusted under 35 U.S.C. 154(b) by 0 days.

(21) Appl. No.: 09/660,784

(22) Filed: Sep. 13, 2000

(51) Int. Cl.[7] ................................ B64C 27/52

(52) U.S. Cl. ............................ 244/17.11; 244/17.23

(58) Field of Search .......................... 244/17.11, 17.19, 244/17.25, 17.23, 17.27, 6

(56) References Cited

U.S. PATENT DOCUMENTS 1,378,112 A 5/1921 Hewitt
1,568,765 A 1/1926 Ortego
1,849,235 A 3/1932 Kibbe
1,887,429 A 11/1932 Price
2,074,342 A 3/1937 Platt
2,388,653 A 11/1945 Hays
2,395,610 A 2/1946 Cavallaro
2,480,806 A 8/1949 Desmoulins
2,486,059 A * 10/1949 Pentecost ................ 244/17.11
2,496,857 A 2/1950 Cronstedt et al.
3,096,953 A 7/1963 Koump
3,554,467 A 1/1971 Yowell
3,690,597 A 9/1972 Di Martino
3,765,622 A 10/1973 Haines
4,084,345 A 4/1978 Tanaka
4,531,692 A 7/1985 Mateus
4,913,376 A 4/1990 Black
4,928,907 A * 5/1990 Zuck ............................ 244/6
5,039,031 A 8/1991 Valverde
5,058,824 A 10/1991 Cycon
5,065,959 A 11/1991 Bhatia et al.
5,149,012 A 9/1992 Valverde
5,167,384 A 12/1992 Krepak
5,259,729 A 11/1993 Fujihira et al.
5,284,454 A 2/1994 Randolph
5,344,100 A 9/1994 Jaikaran
5,370,341 A 12/1994 Leon
5,381,985 A 1/1995 Wechsler et al.
5,383,810 A 1/1995 Loving
5,556,355 A 9/1996 Ostrowski
5,791,592 A * 8/1998 Nolan et al. ............ 244/17.11
5,915,649 A 6/1999 Head
6,182,923 B1 * 2/2001 Weinhart ................ 244/17.25
6,293,492 B1 * 9/2001 Yanagisawa ............ 244/17.25

OTHER PUBLICATIONS

Cox Model Helicopter, "Attack Cobra", date unknown (see attached).

* cited by examiner

*Primary Examiner*—Peter M. Poon
*Assistant Examiner*—Timothy D Collins
(74) *Attorney, Agent, or Firm*—Thorpe North & Western LLP

(57) ABSTRACT

A helicopter propulsion and control system configured for actuating a helicopter airframe according to control inputs of an operator, comprising a counter-rotating rotor set tiltably coupled to the airframe at a first location, the rotor set having a downward thrust vector and a power assembly configured to actuate the counter-rotating rotor set, having a center of gravity, and being fixedly coupled to the rotor set so as to be tiltable therewith, the center of gravity of said power assembly being disposed below the first location where the rotor set is tiltably coupled to the airframe and a control actuator operatively coupled between the power assembly and the airframe to enable the center of gravity of the airframe to move with respect to the center of gravity of the power assembly, and with respect to the thrust vector of the rotor set, whereby pitch and roll of the airframe are controllable by the operator.

38 Claims, 7 Drawing Sheets 212 210 206 204 208 222 214 220 216 202 200 218 224

HELICOPTER PROPULSION AND CONTROL SYSTEM

BACKGROUND OF THE INVENTION

The invention relates to helicopter power and flight control systems. More particularly the invention relates to simplified propulsion and flight control systems incorporated in a coaxial helicopter vehicle.

Coaxial helicopters have been known for many years. However, because of complexities involved in the control of the cyclic and the collective pitch of rotor blades in a coaxial configuration to give roll, pitch and yaw control, development of this type of aircraft has heretofore been limited. Conventional single rotor designs, having a tail rotor for counteracting the tendency of the airframe to turn with respect to the rotor, and for yaw control, predominate. Nevertheless historically several successful coaxial designs have been developed, for example, by Nikolai Kamov and the Kamov design bureau of the former Soviet Union. The Kamov organization continues to produce coaxial helicopters in the Russian Federation. Other coaxial designs exist, for example a small coaxial pilotless craft developed by United Technologies Corporation, of Hartford Conn. An example of a control system for this later craft is disclosed in U.S. Pat. No. 5,058,824.

An alternative to control of coaxial helicopters by control of the pitch of the blades alone is to make the axis of rotation of the coaxial rotor set tiltable with respect to the airframe, which allows pitch and roll control by shifting the weight of the aircraft with respect to a thrust vector of the coaxial rotor set. Such a system is known, for example that disclosed in U.S. Pat. No. 5,791,592, issued Aug. 11, 1998 to Nolan, et al. Yaw control in the Nolan device is by means of two sets of airfoils which are tiltable with respect to axes roughly parallel and normal to the rotor thrust vector. The airfoil set rotating about axes normal to the thrust vector impinges on the downwash from the rotor set, and creates a reaction force vector tending to yaw the airframe right or left depending on which way the set of airfoils is angled. The second set of airfoils appears to function in a manner similar to a tail rudder in a conventional aircraft, and therefore comes into play when the device has developed significant forward speed, but is less operative in yaw control when the helicopter is hovering at a stationary point or otherwise has very low forward speed. In this simplified system there is no need for cyclic blade pitch control, and there is no collective pitch control. Tilt of the coaxial rotor set, and increasing or decreasing the speed of the rotors, provides pitch, roll and lift control.

SUMMARY

It has been recognized that simplifications in design, and the weight and cost savings realized thereby, and commensurate potential advantages in performance for the same cost, argue for a further simplified propulsion and control system in a coaxial rotor helicopter. The invention is directed to this end, and accordingly provides a helicopter propulsion and control system configured for actuating a helicopter airframe having a center of gravity according to control inputs of an operator, comprising: a) a counter-rotating rotor set tiltably coupled to the airframe, the rotor set having an upward thrust vector; b) a power assembly configured to actuate the counter-rotating rotor set, having a center of gravity, and being fixedly coupled to the rotor set so as to be tiltable therewith; and c) a control actuator operatively coupled between the power assembly and the airframe to enable the variable center of gravity of the airframe to move with respect to the center of gravity of the power assembly, and with respect to the thrust vector of the rotor set, whereby pitch and roll of the airframe are controllable by the operator.

In a more detailed aspect, the invention further provides at least one airfoil disposed so as to be in the downwash of said rotor set, said airfoil cooperating with the downwash of the rotor set to create a controllable sideways thrust vector. An airfoil control actuator is operatively coupled between the airfoil and the airframe, configured to change the orientation of the airfoil so as to orient the sideways thrust vector according to control inputs of the operator, whereby yaw of the airframe is controllable by the operator. Two parallel airfoils can be used in tandem to minimize their size, or two counter rotating airfoils can be used, each being disposed on opposite sides of the airframe.

In another more detailed aspect, said power assembly further comprises a prime mover and a gear set. The gear set divides power output from the prime mover into two counter-rotating shafts to drive the respective counter-rotating blades. The gear set can also effect a reduction, whereby rotor rotational speed can be lower than that of the prime mover. The gears can be arranged in different ways, for example a planetary configuration or a beveled configuration. In the latter case a single shaft rotation input, and a dual coaxial counter-rotation shaft output oriented orthogonal to the input can be provided. The prime mover can be any suitable means of energy conversion, such as an internal combustion engine, a turbomachine such as one of a number of turbine engines conventionally used to power helicopters, and an electric motor. The latter example is primarily used for smaller pilotless aircraft, for example in inertially-guided and remote-controlled controlled applications.

In a further more detailed aspect, in one embodiment the power assembly is rotatable with respect to the airframe. In one embodiment the power assembly has a single output shaft, and a first rotor of the counter-rotating rotor set is attached to the power assembly, rotating in a first direction, and a second rotor of the counter rotating rotor set is attached to the single output shaft, and rotates in the opposite direction.

As mentioned, in a further more detailed aspect the invention has application in pilotless aircraft, which may be small, as well as vehicles designed to carry a human operator. A pilotless system where the operator remotely pilots the helicopter can further comprise a transmitter and a receiver cooperating with: i) the actuator(s) disposed between the airframe and the power assembly and ii) an actuator controlling the position of the airfoil, and iii) a power controller controlling rotor speed, to provide control inputs. In another example the operator is a programable electronic guidance and control system operatively connected to the power controller and the rotor control and airfoil actuators, whereby the helicopter is substantially self-controlled. In full-size applications the operator pilots the helicopter onboard the airframe, and in such systems the helicopter system further comprises controls actuatable by the operator carried by the airframe. Such controls can comprise for example a joystick or yoke to provide control of pitch and roll, peddles to control yaw, and a throttle to control rotor speed. A collective pitch control is not required, as the magnitude of the thrust vector of the rotor set is controllable solely by variation of the speed of rotation of the counter-rotating rotor set. However, a collective pitch control can be used in combination with motor speed to control lift in applications where cost is of less concern.

Differential collective blade pitch control can be used to provide unbalanced torque in the rotor set to provide yaw control input.

In another more detailed aspect, the actuator disposed between the power assembly and the airframe can further comprise both a pitch actuator disposed to tilt the rotor set and power assembly in a first direction to control pitch, and a roll actuator disposed to tilt the rotor set and power assembly in a second direction to control roll.

Further details, features and advantages will become apparent with reference to the following detailed description, taken in conjunction with the accompanying drawings, which illustrate, by way of example, the features of the invention.

DETAILED DESCRIPTION OF THE PREFERRED EMBODIMENT(S)

Figure 1:
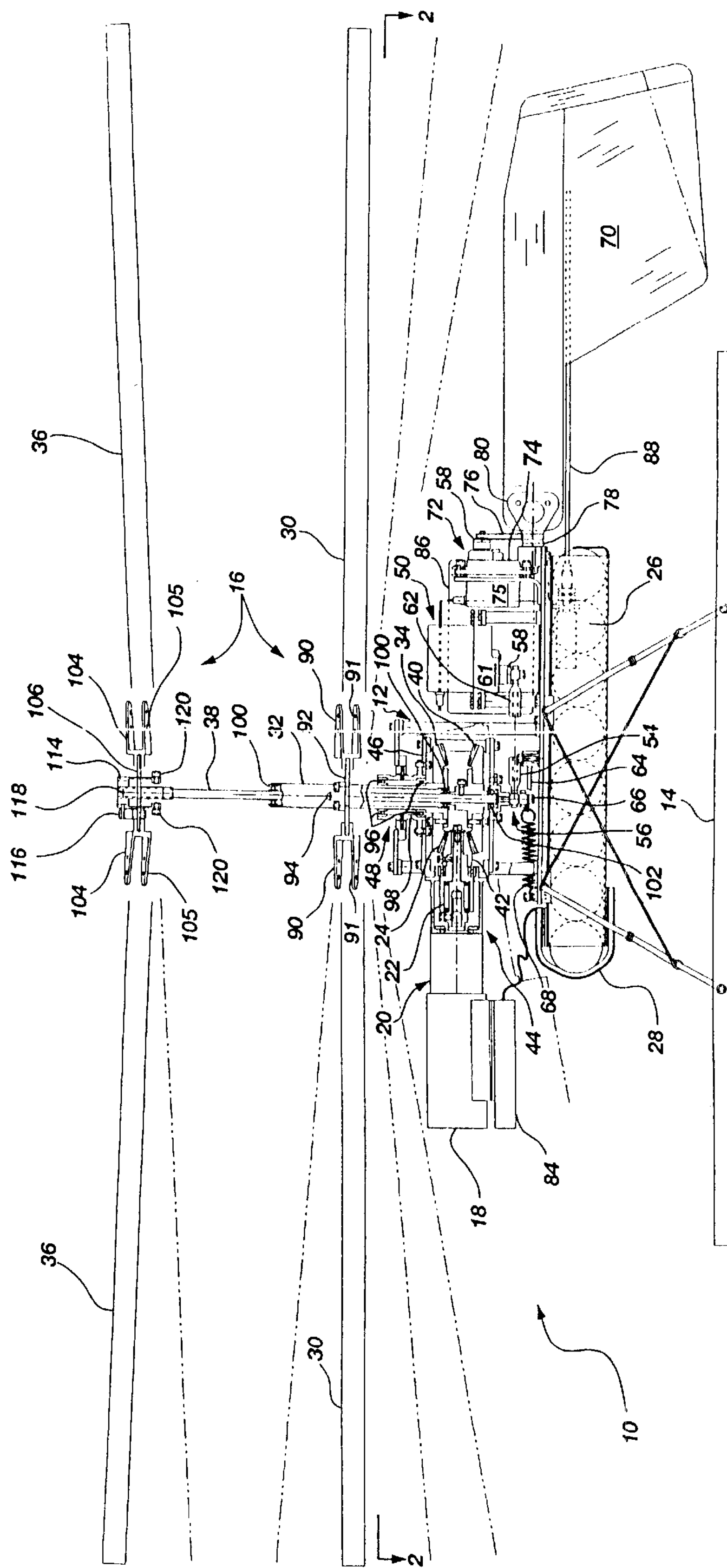
FIG. 1 is a side elevation view, partially in section, of a helicopter in accordance with principles of the invention.
Figure 2:
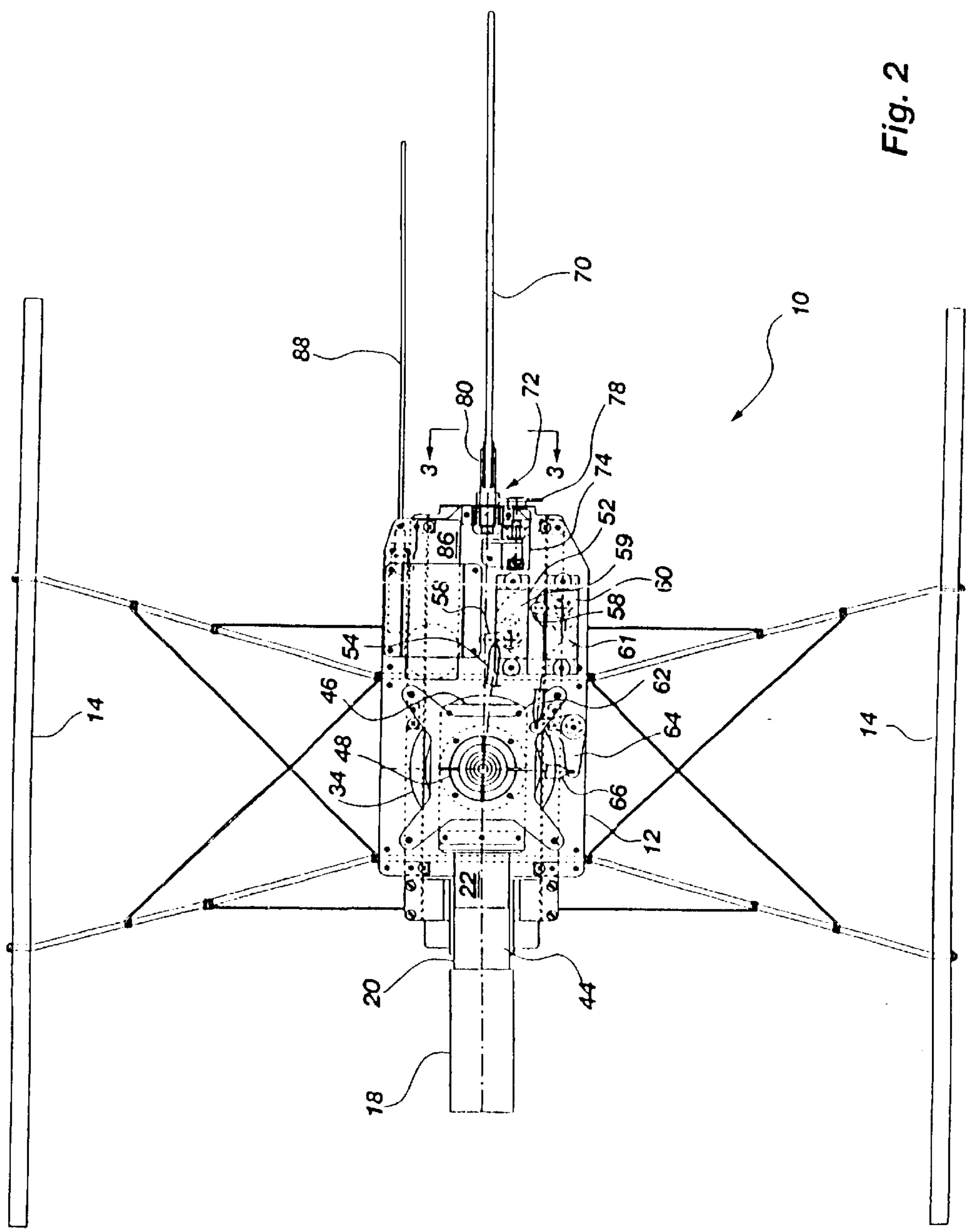
FIG. 2 is a top view, taken along line 2—2 in FIG. 1, of the helicopter shown in FIG. 1.

With reference to FIGS. 1 and 2 of the drawings, which drawings are provided for purposes of illustration, the invention is embodied in a small pilotless helicopter 10 having an airframe 12 supported by skids 14 while on the ground, and a coaxial rotor set 16 when airborne. A prime mover in the form of an electric motor 18 powers the helicopter through a reduction gear set 20, a sprag or overrunning clutch 22 and bevel gear set 24. Power for the electric motor comes from batteries 26 contained in a battery pack 28 slung beneath, and carried by, the airframe 12.

A first set of rotor blades 30 are actuated by a first, or outer, concentric drive shaft 32 through a first, or upper, bevel gear 34. A second, or upper, set of rotor blades 36, is driven by a second, or inner, drive shaft 38 connected to a second, or lower, bevel gear 40. Power is transmitted to the first and second bevel gears by a pinion gear 42 operatively connected to the overrunning clutch 22.

The bevel gear set 24 comprising the first 34 and second 40 bevel gears and pinion gear 42, as well as the clutch 22, the motor 18, and reduction gear set 20, together comprise a power assembly 44. The power assembly further comprises a power assembly frame 46 which carries, supports, and aligns the various elements of the power assembly. The power assembly is tiltably suspended from the airframe 12 by a gimbal 48 bolted thereto. The gimbal is comfigured to support the airframe in flight and provide relative rotation in two axes (pitch and roll) between the airframe and the coaxial rotor set.

The coaxial rotor set 16 is thereby fixedly connected to the power assembly 44 so that they tilt as a unit with respect to the airframe 12, as facilitated by the gimbal 48. A control actuator 50 tilts the power assembly and rotor set with respect to the airframe in response to control inputs provided by an operator (not shown) to provide pitch and roll control for the helicopter 10. The control actuator, as will be further described below, connects the airframe and the power assembly in such as way as to allow the center of gravity of the airframe (and everything supported thereby) to be shifted with respect to the power assembly and rotor set. In this way, the center of gravity of the airframe, and therefore of the helicopter as a whole, is shifted with respect to a thrust vector comprising the force vector generated by the rotation of the counter-rotating rotor set, and which generally provides the lifting force on the helicopter. Therefore, pitch and roll control is by weight shifting, as opposed to conventional control by cyclic alteration of the pitch of the rotor blades 30, 36.

In further detail, the control actuator 50 in the illustrated embodiment comprises a pitch actuator 52 which tilts the power assembly and rotor set forwardly and rearwardly with respect to the airframe through the gimbal 48 by pushing and pulling a pitch linkage 54 connected to a hub 56 at the bottom of the power assembly frame 46. In the illustrated embodiment the pitch actuator is a servo 53 operatively linked to the pitch linkage 54 by a crank 58 having provision for adjustment of the control by selective connection of the pitch linkage at one of several points along the length of the crank giving rise to more or less pushing and pulling motion for the same amount of rotation of the crank actuated by the servo comprising the pitch actuator 52.

Control actuator 50 further comprises a roll actuator 60 comprising a servo 61 which, like the pitch actuator 52, also turns a crank 58 with provision for adjustment. The roll actuator tilts the power assembly 44 and rotor set 16 transversely, to provide roll control by means of a first roll linkage operatively connected between the crank 58 of the roll actuator 60 and a bell crank 64 rotatably connected to the airframe 12, and a second roll linkage 66 operatively connected between the bell crank 64 and the hub 56. As can be appreciated, the bell crank arrangement allows the pitch and roll actuators to be disposed so as to be mounted together and move linkages 54 and 62 in roughly parallel directions, yet provide control inputs at orthogonal directions at the hub 56 at the bottom of the power assembly. As will also be appreciated, pitch and roll controls are independent, and can be applied separately or together in controlling flight of the helicopter 10. A spring 68 is provided between the hub 56 and the airframe 12 to eliminate any slop in the control linkages so that pitch and roll control by the control actuator 50 will be immediate and precise.

Figure 3:
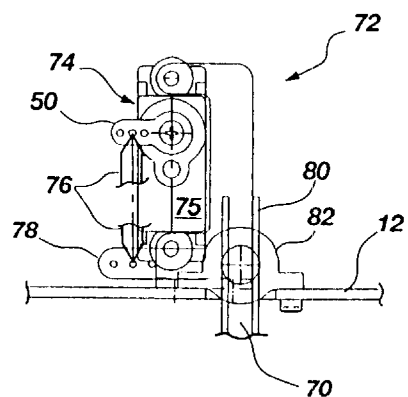
FIG. 3 is a rear elevation view, taken along line 3—3 in FIG. 2, of a portion of the helicopter shown in FIG. 2.

With reference to FIGS. 1, 2 and 3, the yaw control in the illustrated embodiment is facilitated by an airfoil 70 which is positioned in, and can be rotated in, the downwash from the counter-rotating coaxial rotor set 16. As will be appreciated, this is done to redirect air flow laterally, and thereby provide a transverse thrust vector displaced from the center of gravity of the helicopter 10 thereby tending to yaw the helicopter right or left depending upon the direction of rotation of the airfoil. This rotation is controlled by an airfoil control actuator 72. The airfoil actuator further comprisises yaw actuator 74 comprising a servo 75 having a crank 58 as described above. The crank is connected by a yaw linkage 78 to a yaw control arm 78 integral with an airfoil cuff 80 rotatably carried in a sleeve 82 mounted to the airframe 12. In this way, the airfoil is carried by the airframe and angled right or left by the yaw actuator 74. The airfoil control actuator 72 further comprises adjustability in the yaw control arm in the illustrated embodiment. Combined with adjustability in the crank 58, yaw control can be made more sensitive or less sensitive and a "neutral" position can be adjusted to counteract any slight imbalance in the counter rotating coaxial rotor set 16 tending to yaw the airframe right or left.

Adjustability of control sensitivity is also provided in pitch and roll control by at least two means, one of which has to do with the rotor set control actuator 50, which has adjustability in the cranks 58 operatively connected to both the roll actuator 60 and pitch actuator 52 of the rotor control actuator 50. The other has to do with the coaxial rotor set 16, as will be discsssed below.

With reference to FIGS. 1 and 2, control of the magnitude of the thrust vector from the coaxial rotor set 16 is accomplished solely by changing the speed of rotation of the rotor set. A power controller 84 controls the speed of the motor 18, and thereby the power delivered to the coaxial rotor set 16. The power controller, as well as the control actuator 50 controlling the tilt of the rotor set, and the yaw control actuator 72, are all operatively electrically connected to a receiver 86 carried by the airframe 12. The receiver further comprises an antenna 88. This allows an operator (not shown) to control the helicopter 10 from a remote location. A transmitter (not shown) unit includes operator controls. Transmitter and receiver units for this application are widely commercially available.

Further details of construction of the exemplary embodiment will now be given. The first, or lower, set of rotor blades 30 are attached to the first, or outer, drive shaft 32 by blade cuffs 90 comprising clevis pieces 91 attached to a rotor hub 92 connected to the outer drive shaft 32 through a teetering hinge pin 94 disposed substantially orthogonally to the longitudinal axes of the lower rotor blades 30. The teetering hinge is located slightly above the rotor hub, and accordingly the lower rotor set is under-slung.

The first or outer drive shaft 32 is supported by outer bearings 96 and a sleeve 98 attaching the power assembly frame 46 to the gimbal 48. A set of inner bearings 100 are disposed between the first or outer drive shaft 32 and the second or inner drive shaft 38. Another bearing 102 is disposed between the inner drive shaft and the power assembly frame 46 at the lower end of the inner drive shaft adjacent the hub 56. These bearings support the various elements and allow rotation and counter rotation of the elements as described therein.

Figure 4:
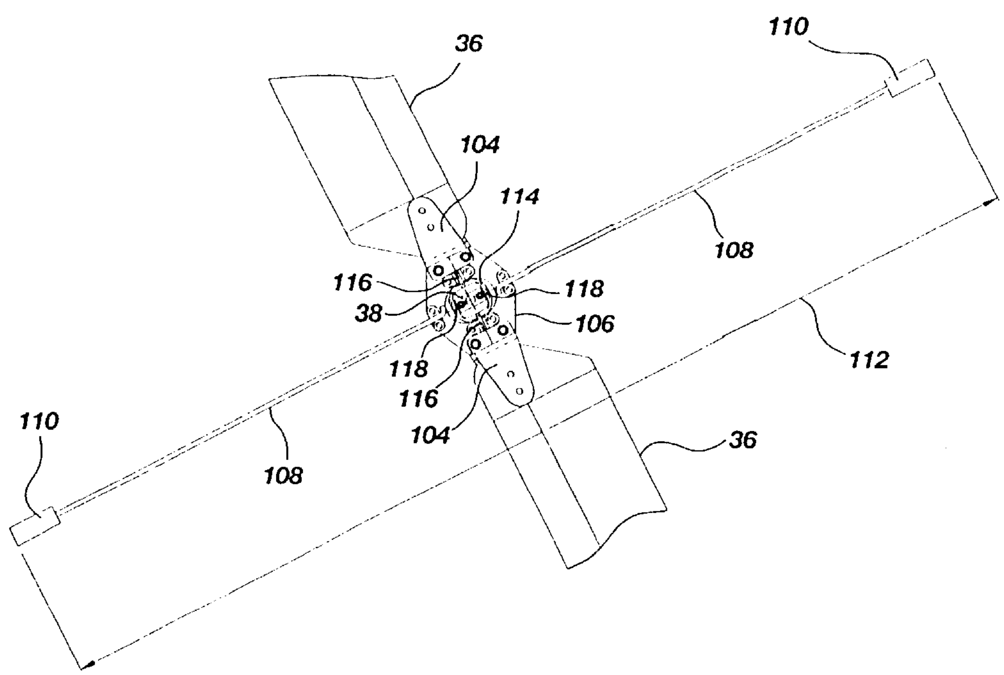
FIG. 4 is a top view, partially in cut-away, of a portion of the upper rotor assembly of the coaxial rotor set of the helicopter shown in FIG. 1.

With reference to FIGS. 1 and 4, details of connection of the second or upper set of rotors 36 will now be described in more detail. The upper rotors are attached to the second or inner drive shaft 38 by rotor cuffs 104 comprising clevis pieces 105 attached to an upper rotor hub plate 106. The upper rotors 36 are inclined slightly upward, forming a coned rotor set, in contrast to the lower rotors 30 which are horizontal. The angle of coning is about 2.5 degrees upward. Also, it should be noted that the upper rotors are pitched less than the lower rotors to take into account the fact that there is, in effect, an inflow from the upper rotor to the lower rotor and accordingly for the two rotors to be "balanced", so as not to induce rotation of the airframe, the lower rotor must have more "bite." As an example, the upper rotors can be inclined at about eight to twelve degrees, while the lower rotors can be inclined at about eleven to fifteen degrees. In one embodiment, adjustment means can be provided (not shown) to allow fine adjustment of the relative pitch of the two rotors to balance them. This can be by adjusting the pitch at the root of one or both of the upper 36 and lower 30 rotors. Alternatively, or additionally, adjustment tabs (not shown) can be provided on the rotors, which are setable to have more or less pitch than the rotor as a whole, to provide the fine adjustment in relative pitch mentioned. The simplest arrangement is for relative pitch of the upper and lower rotors to be "factory set" and require no further adjustment.

Returning to discussion of the upper rotors 36 of the coaxial rotor set 16, Bell stabilizer bars 108 and weights 110 are provided to add stability to the upper rotor. By adding stability to the upper rotor, the control response of the coaxial rotor set 16 is affected. The distance 112 between the weights 110 is adjustable by means of set screws (not shown) which can be loosened and the weights moved and then the set screws are re-tightened. This allows the response of the coaxial rotor set to control inputs to be adjusted. For example, the stabilizer can be supplied with the weights fully extended. The weights are then adjusted inwardly as the operator (not shown) gains proficiency in controlling the helicopter 10. This is the second means by which pitch and roll control sensitivity can be adjusted, the first being in the control actuator 50 discussed above.

Furthermore, it will be appreciated that the upper rotor can tilt and teeter in two axes. The rotor hub plate is connected to a hub sleeve 114 by pins 116, which allows the rotors to rotate substantially about their longitudinal axes, providing feathering. The hub sleeve is connected to the second or inner drive shaft 38 by a teetering pin 118 located slightly above the hub plate. This provides an underslung rotor system. The teetering pin 118 is located approximately at a position along a line connecting the centers of gravity of the two upper rotors 36. The amount of teetering provided can be adjusted by adjustment screws 120 disposed through the hub sleeve 114, as can best be appreciated with reference to FIG. 1. This provides a stable rotor system.

Figure 5:
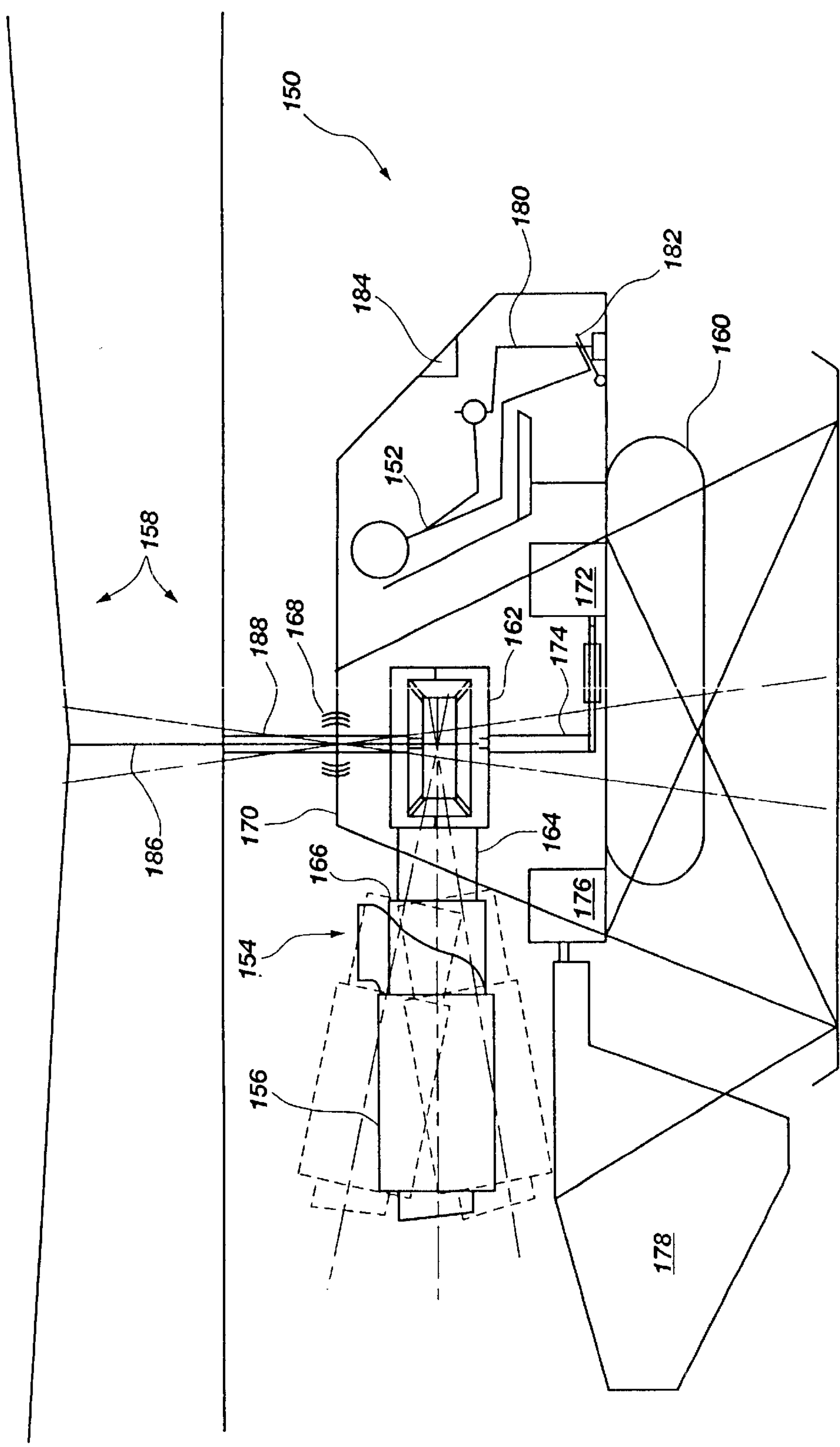
FIG. 5 is a schematic side elevation illustration of a piloted helicopter in accordance with principles of the present invention.

With reference to FIG. 5, it will be appreciated that the helicopter propulsion and control system previously described can be embodied in a larger helicopter 150, being large enough to accommodate a pilot 152. While the operative principles are similar, the configuration of the aircraft is changed somewhat from the pilotless vehicle discussed above. For example, a power assembly 154 comprises an internal combustion engine or a turbomachine 156 configured to function as the prime mover and which supplies power to the counter-rotating coaxial rotor set 158. Rather than batteries, a fuel storage tank 160 is provided. A gear box 162 can contain bevel gears similar to those previously described, and can also include reduction gearing. A clutch 164 can be provided, as well as an additional reducing gear set 166, particularly if the prime mover is of a type producing power at a high r.p.m. The power assembly is, again, supported by a gimbal 168 which tiltably connects the power assembly 154 to the airframe 170. A control actuator 172 which can further comprise separate pitch and roll actuators (not shown) is operatively connected between the airframe 170 and a hub 174 at the bottom of the power assembly as before described. This arrangement allows pitch and roll control as discussed above.

A yaw (or airfoil) actuator 176, supported by the airframe 170, controls an airfoil 178. The airfoil is tiltable to control yaw as discussed above.

A joystick 180 can be provided to facilitate pitch and roll control. Pedals 182 can be provided for yaw control. A throttle control (not shown) can be provided on the joystick, to enable fine control of speed of the rotor set 158, thereby controlling lift. Conventional avionics can be provided, with a display 184 provided for convenience of the pilot 152.

Figure 6:
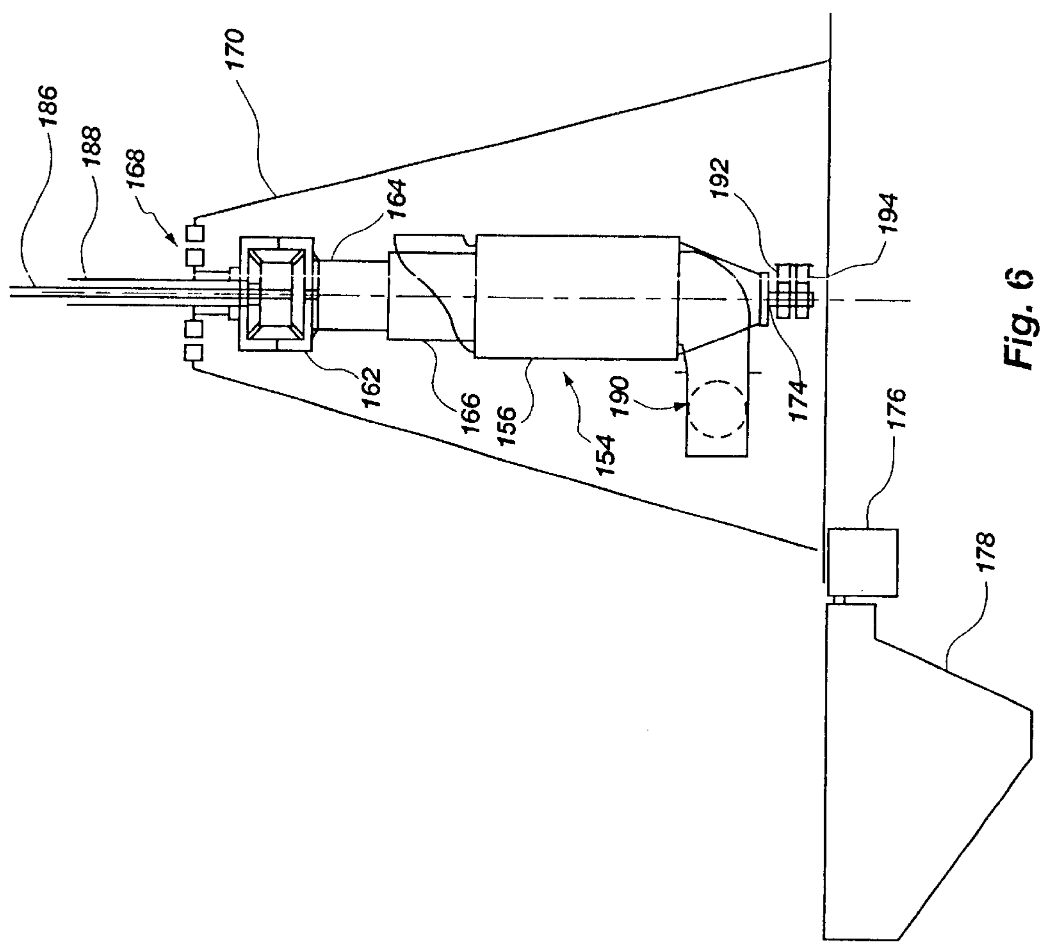
FIG. 6 is a schematic side elevation view of a portion of the helicopter as illustrated in FIG. 5 showing an alternative arrangement.

With reference to FIGS. 5 and 6, in an alternative embodiment the power assembly 154 can be oriented so that the output shaft of the prime mover 156 is oriented parallel to drive shafts 186, 188 driving the counter rotating rotor set (not shown). In this embodiment, a turbomachine is shown for the prime mover, and the exhaust therefrom is directed by a controllable thrust diverter 190, so as to flow rearwardly, or to the right or left, thereby supplementing yaw control provided by the airfoil 178. Linkages 192, 194 are connected at the bottom of the power assembly 154 to the hub 174 and provide control inputs from the control actuator (not shown) for pitch and roll control as discussed above. The helicopter of this embodiment functions otherwise as discussed above.

Figure 7:
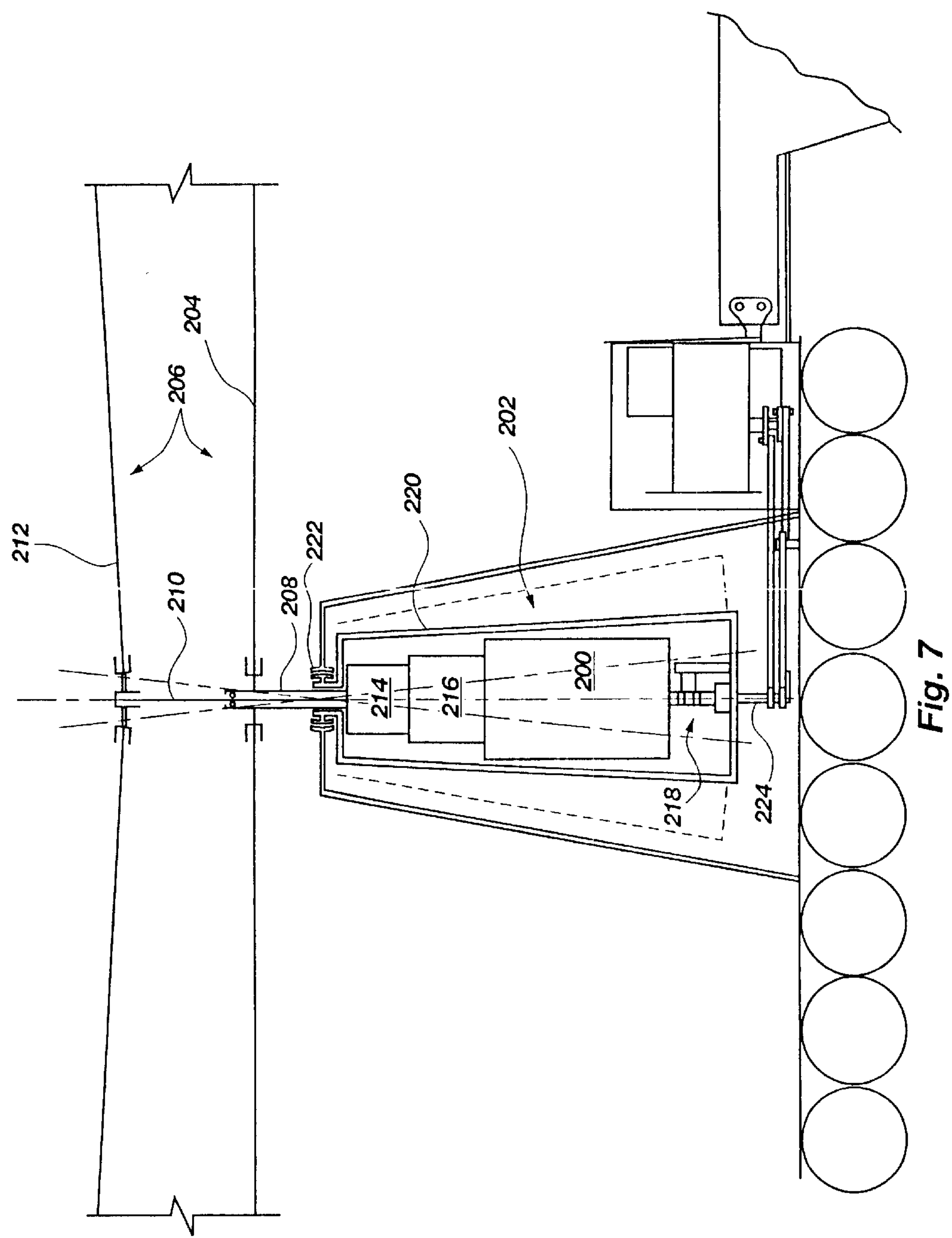
FIG. 7 is a schematic side elevation illustration of a portion of a helicopter in accordance with principles of the invention in another embodiment.

With reference to FIG. 7, in another embodiment of the invention in a pilotless aircraft as described above (with reference to FIGS. 1 through 4) the helicopter 10 is modified so that the prime mover 200 of the power assembly 202 is directly coupled so as to rotate with one of the rotors 204 of the counter-rotating coaxial rotor set 206. More specifically, the outer drive shaft 208 is directly coupled to the prime mover, and the two rotate together, driving the lower rotor 204. The inner drive shaft 210 comprises an output shaft from the prime mover, and drives the upper rotor 212. A power assembly frame 220 is supported by a gimbal 222 and is actuated by a hub 224 to tilt the power assembly and counter rotating rotor set 206 as previously described with respect to the pilotless helicopter illustrated by FIGS. 1 through 4.

In the embodiment illustrated by FIG. 7, a sprag or overrunning clutch 214 as described above is operatively connected only to the inner drive shaft 210. Likewise, a reduction gear set 216, provided if required, drives the inner shaft 210. Torque is transmitted to the outer drive shaft 208 through casings of the elements of the power assembly 202 (namely: the prime mover-in this case an electric motor 200; the reduction gear set 216; and the sprag 214).

In the illustrated embodiment, the electric motor comprising the prime mover 200 is a DC motor, and a commutator 218 is provided to supply power to the motor. As can be appreciated, either one or two disks can be used in the commutator, depending on whether the motor casing and airframe both comprise a ground and are used as a current path.

As can be appreciated, the concept of having the prime mover 200 of the power assembly 202 rotate with one of the rotors 204 could be implemented in a full size helicopter. For example, a radial piston internal combustion engine (not shown), or a turbomachine (not shown) can be adapted for such an implementation. Motor speed control and thereby lift, can be controlled by throttling fuel delivered to the prime mover through a rotating hub (not shown) and such a helicopter would operate otherwise essentially as previously described.

Figure 8:
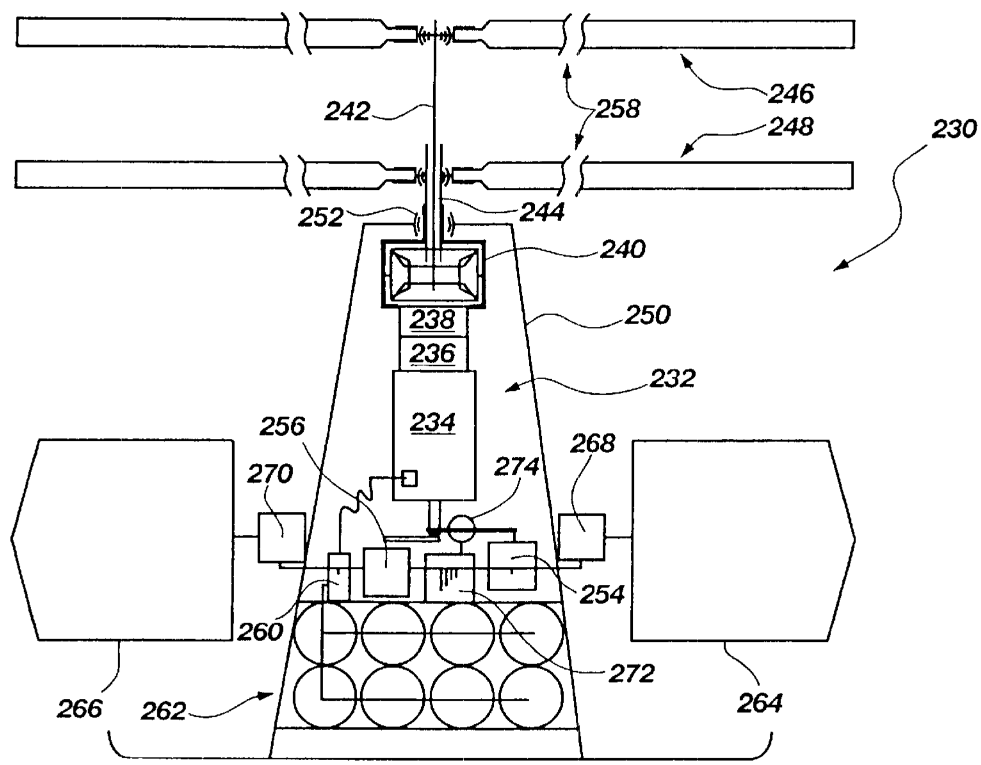
FIG. 8 is a side elevation schematic illustration of a helicopter in another embodiment in accordance with principles of the invention.

With reference to FIG. 8 of the drawings, in another exemplary embodiment the invention can be incorporated in a pilotless helicopter 230 which comprises a power assembly unit 232 comprising an electric motor prime mover 234 a reduction gear set 236, a clutch 238 as described above, and a gear box 240 configured for dividing the power from the prime mover 234 between an inner drive shaft 242 and an outer drive shaft 244. The gear box can be a non-reducing bevel gear arrangement shown schematically, or it can comprise a reducing or non-reducing planetary gear arrangement (not shown).

The arrangements for the upper rotor 246 and lower rotor 248 are otherwise as described above. The power assembly 232 is suspended from the airframe 250 by a gimbal 252 as before described. A pitch actuator 254 and roll actuator 256 comprise a control actuator tilting the power assembly and counter rotating axial rotor set 258 with respect to the airframe as previously discussed. Also, a power controller 260 is operatively connected to the electric motor comprising a prime mover 234, and batteries of a battery pack 262, as previously described, with a difference being that the power controller is carried by the airframe rather than the power assembly in this vertical configuration. A spinning prime mover (not shown) directly coupled to one of the rotors can alternatively be provided.

Another difference is that two airfoils 264, 266 are provided, each actuated by airfoil or yaw actuators 268, 270 respectively. In this illustrated embodiment, the airfoils are disposed "fore and aft", and tilt in opposite directions to provide a balanced force reaction fore and aft, and to provide a rapid response to yaw control input. A receiver 272 and antenna 274 are operatively connected to all control elements, so that control inputs from a remote operator (not shown) are translated into motions of the aircraft.

Figure 9:
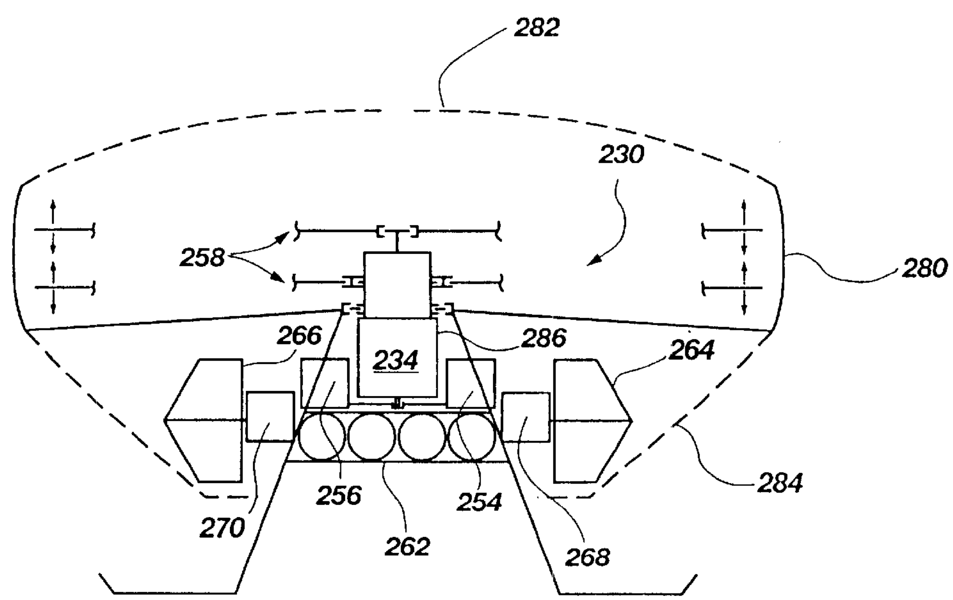
FIG. 9 is a side elevation schematic illustration of a helicopter as illustrated in FIG. 8 in a different embodiment.

Turning now to FIG. 9, in another embodiment an outer protective enclosure 280 can be provided, cofigured to enclose the counter-rotating coaxial rotor set 258 of a pilotless helicopter 230, such as that described above with reference to FIG. 8. The protective enclosure comprises an upper portion 282 having openings configured for admitting air for intake into the counter-rotating coaxial rotor set 258. The enclosure also includes a lower portion 284 which includes openings allowing downwash from the rotor set to escape from the enclosure, thereby facilitating lift of the helicopter 230. A mesh configuration having low resistence to airflow can be used.

A power assembly 286 can be provided, which is of the kind described above in connection with FIG. 8, or which has a rotating prime mover directly coupled to one of the rotors of the counter rotating rotor set 258 (such as described above in connection with FIG. 7). As will be appreciated, the pilotless helicopter 230 shown in the embodiment of FIG. 9 can be operated indoors, or in other situations where the rotors need to be protected from the environment and vice-versa. Also, in this embodiment the airfoils 264, 266 are at least partially hidden within the protective enclosure, and this and other elements of the pilotless helicopter 230 can thereby be at least partially hidden from view. This can be used to alter the appearance of the aircraft, and disguise its true nature and/or operative features. Accordingly, visual effects, such as making the pilotless helicopter appear as a "flying saucer," can be achieved.

While several particular forms of the invention have been illustrated and described, it will also be apparent that various modifications can be made without departing from the sprit and scope of the invention.

What is claimed is:

1. A helicopter propulsion and control system configured for actuating a helicopter airframe having a center of gravity according to control inputs of an operator, comprising:

a counter-rotating rotor set tiltably coupled to the airframe at a first location, the rotor set having a downward thrust vector;

a power assembly configured to actuate the counter-rotating rotor set, having a center of gravity, and being fixedly coupled to the rotor set so as to tilt therewith, the center of gravity of said power assembly being disposed below the first location where the rotor set is tiltably coupled to the airframe;

a control actuator operatively coupled between the power assembly and the airframe to enable the center of gravity of the airframe to move with respect to the center of gravity of the power assembly, and with respect to the thrust vector of the rotor set, whereby pitch and roll of the airframe are controllable by the operator.

2. A system in accordance with claim 1, further comprising an airfoil disposed so as to be in downwash of said rotor set, said airfoil cooperating with the downwash of the rotor set to create a controllable lateral thrust vector;

an airfoil control actuator operatively coupled between the airfoil and the airframe, to change the orientation of the airfoil so as to orient the sideways thrust vector according to control inputs of the operator, whereby yaw of the airframe is controllable by the operator.

3. A system in accordance with claim 1, wherein said power assembly further comprises:

a prime mover;

a gear set.

4. A system in accordance with claim 3, wherein the prime mover is an electric motor.

5. A system in accordance with claim 3, wherein the prime mover is an internal combustion engine.

6. A system in accordance with claim 3, wherein the prime mover is a turbomachine.

7. A system in accordance with claim 3, wherein the gear set comprises a reduction gear set.

8. A system in accordance with claim 7, wherein the gear set comprises a planetary reduction gear set.

9. A system in accordance with claim 3, wherein the gear set comprises a bevel gear set.

10. A system in accordance with claim 9, wherein the bevel gear set comprises a single shaft rotation input and a dual counter-rotation shaft output oriented orthogonal to the input.

11. A system in accordance with claim 1, wherein the power assembly is rotatable with respect to the airframe.

12. A system in accordance with claim 11, wherein the power r assembly has a single output shaft, and a first rotor of the counter rotating rotor set is attached to the power assembly rotating in a first direction and a second rotor of the counter rotating rotor set is attached to the single output shaft and rotates in the opposite direction.

13. A system in accordance with claim 12, wherein the power assembly comprises:

a motor;

a reduction gear set.

14. A system in accordance with claim 13, whereby a relative rotational speed of the counter-rotating rotors is less than a speed of the motor.

15. A system in accordance with claim 1, wherein the operator is human.

16. A system in accordance with claim 15, wherein the operator remotely pilots the helicopter, and the system further comprises a transmitter and a receiver cooperating with the actuator disposed between the airframe and the power assembly to provide control inputs.

17. A system in accordance with claim 15, wherein the operator pilots the helicopter onboard the airframe, and wherein the helicopter system further comprises controls actuatable by the operator carried by the airframe.

18. A system in accordance with claim 1, wherein the actuator disposed between the power assembly and the airframe further comprises;

a pitch actuator disposed to tilt the rotor set and power assembly in a first direction to control pitch; and a roll actuator disposed to tilt the rotor set and power assembly in a second direction to control roll.

19. A system in accordance with claim 18, further comprising:

an airfoil disposed so as to be in downwash of said rotor set, said airfoil cooperating with the downwash of the rotor set to create a controllable sideways thrust vector;

an airfoil control actuator operatively coupled between the airfoil and the airframe, configured to change the orientation of the airfoil so as to orient the sideways thrust vector according to control inputs of the operator, whereby yaw of the airframe is controllable by the operator.

20. A system in accordance with claim 19, wherein said power assembly further comprises:

a prime mover;

a gear set;

a first rotor output shaft rotating in a first direction;

a second rotor output shaft rotating in a second direction opposite the first direction;

and wherein the prime mover powers the rotor set through the gear set, the gear set transferring power to the first and second output shafts, and the counter-rotating rotor set being powered by the first and second output shafts.

21. A helicopter propulsion and control system configured for actuating a helicopter airframe having a center of gravity according to control inputs of an operator, comprising:

a counter-rotating rotor set tiltably coupled to the airframe at a first location, the rotor set having a downward thrust vector;

a power assembly configured to actuate the counter-rotating rotor set, having a center of gravity below the first location, the power assembly being fixedly coupled to the rotor set so as to tilt therewith;

a rotor control actuator operatively coupled between the power assembly and the airframe; whereby the center of gravity of the airframe is movable with respect to the center of gravity of the power assembly, and with respect to the thrust vector of the rotor set, whereby pitch and roll of the airframe are controllable by the operator;

an airfoil disposed so as to be in downwash of said rotor set, said airfoil cooperating with the downwash of the rotor set to create a controllable sideways thrust vector;

an airfoil control actuator operatively coupled between the airfoil and the airframe, configured to change the orientation of the airfoil so as to orient the sideways thrust vector according to control inputs of the operator, whereby yaw of the airframe is controllable by the operator; and a power controller operatively connected to the power assembly to enable control of power output to the counter-rotating rotor set, whereby the magnitude of the thrust vector of the rotor set can be controlled.

22. A system in accordance with claim 21, wherein said power assembly further comprises:

a prime mover having a prime mover output shaft; and a gear set operatively coupled to the prime mover output shaft;

a first output shaft operatively coupled to the gear set, rotating in a first direction operatively coupled to a first rotor of the counter-rotating rotor set.

23. A system in accordance with claim 22, wherein a second rotor of the counter-rotating rotor set is operatively connected to the power assembly.

24. A system in accordance with claim 22, further comprising a second output shaft operatively coupled to the gear set, rotating in a second opposite the direction of rotation of the first output shaft, operatively coupled to a second rotor of the counter-rotating rotor set.

25. A system in accordance with claim 21, wherein the operator is human.

26. A system in accordance with claim 25, further comprising:

a receiver carried by the airframe and operatively connected to the power controller and the rotor control actuator and airfoil actuator; and, a transmitter, whereby the helicopter is remotely controlled.

27. A system in accordance with claim 21, wherein the operator is a programable electronic guidance and control system operatively connected to the power controller and the rotor control and airfoil actuators, whereby the helicopter is substantially self-controlled.

28. A system in accordance with claim 21, wherein the magnitude of the thrust vector of the rotor set is controllable solely by variation of the speed of rotation of the counter-rotating rotor set.

29. A helicopter propulsion and control system configured for actuating a helicopter, the helicopter having an airframe having a center of gravity, according to control inputs of an operator, comprising:

a counter-rotating rotor set tiltably coupled to the airframe at a first location, the rotor set having a downward thrust vector;

a power assembly configured to actuate the counter-rotating rotor set, having a center of gravity below the first location, the power assembly being fixedly coupled to the rotor set so as to tilt therewith, said power assembly further comprising:

a prime mover;

a gear set;

a first output shaft;

a second output shaft, the first and second output shafts being operatively connected to a first and second rotor of the counter-rotating rotor set and to the gear set, power from the prime mover thereby being transferred to the counter-rotating rotor set;

a rotor control actuator operatively coupled between the power assembly and the airframe; whereby the center of gravity of the airframe is movable with respect to the center of gravity of the power assembly, and with respect to the thrust vector of the rotor set, whereby pitch and roll of the airframe are controllable by the operator;

an airfoil disposed so as to be in downwash of said rotor set, said airfoil cooperating with the downwash of the rotor set to create a controllable sideways thrust vector;

an airfoil control actuator operatively coupled between the airfoil and the airframe, configured to change the orientation of the airfoil so as to orient the sideways thrust vector according to control inputs of the operator, whereby yaw of the airframe is controllable by the operator; and a power controller operatively connected to the power assembly to enable control of power output to the counter-rotating rotor set, whereby the magnitude of the thrust vector of the rotor set can be controlled.

30. A system in accordance with claim 29, wherein the prime mover comprises an electric motor.

31. A system in accordance with claim 30, wherein the rotor control actuator further comprises:

a pitch actuator; and a roll actuator; each being operatively connected between the power assembly and the airframe.

32. A system in accordance with claim 33, further comprising a receiver operatively connected with the power controller and the roll, pitch, and airfoil actuators, whereby the helicopter is remotely controllable by the operator.

33. A helicopter propulsion and control system configured for actuating a helicopter airframe according to control inputs of an operator, comprising:

a counter-rotating rotor set tiltably coupled to the airframe, the rotor set having a downward thrust vector and an axis of rotation;

a power assembly configured to actuate the counter-rotating rotor set, having a center of gravity, and being fixedly coupled to the rotor set so as to tilt therewith with respect to the airframe, and rotatable with respect to the airframe about an axis substantially parallel to the axis of rotation of the rotor set;

a control actuator operatively coupled between the power assembly and the airframe to enable a center of gravity of the airframe to move with respect to the center of gravity of the power assembly, and with respect to the thrust vector of the rotor set, whereby pitch and roll of the airframe are controllable by the operator.

34. A system in accordance with claim 33, wherein the power assembly has an output shaft, and a first rotor of the counter rotating rotor set is attached to the power assembly, the power assembly and first rotor rotating in a first direction and a second rotor of the counter rotating rotor set is attached to the output shaft and rotates in the opposite direction.

35. A system in accordance with claim 34, wherein the power assembly comprises:

a motor;

a reduction gear set.

36. A system in accordance with claim 35, whereby a relative rotational speed of the counter-rotating rotors is less than a speed of the motor.

37. A system in accordance with claim 34, further comprising coaxial drive shafts comprising an inner drive shaft and an outer drive shaft, and wherein the output shaft comprises the inner drive shaft.

38. A system in accordance with claim 34, further comprising coaxial drive shafts comprising an inner drive shaft and an outer drive shaft, and wherein the output shaft comprises an outer drive shaft.

* * * * *